(No Model.)
N. NILSON.
STEAM TRAP.
No. 577,623.    Patented Feb. 23, 1897.
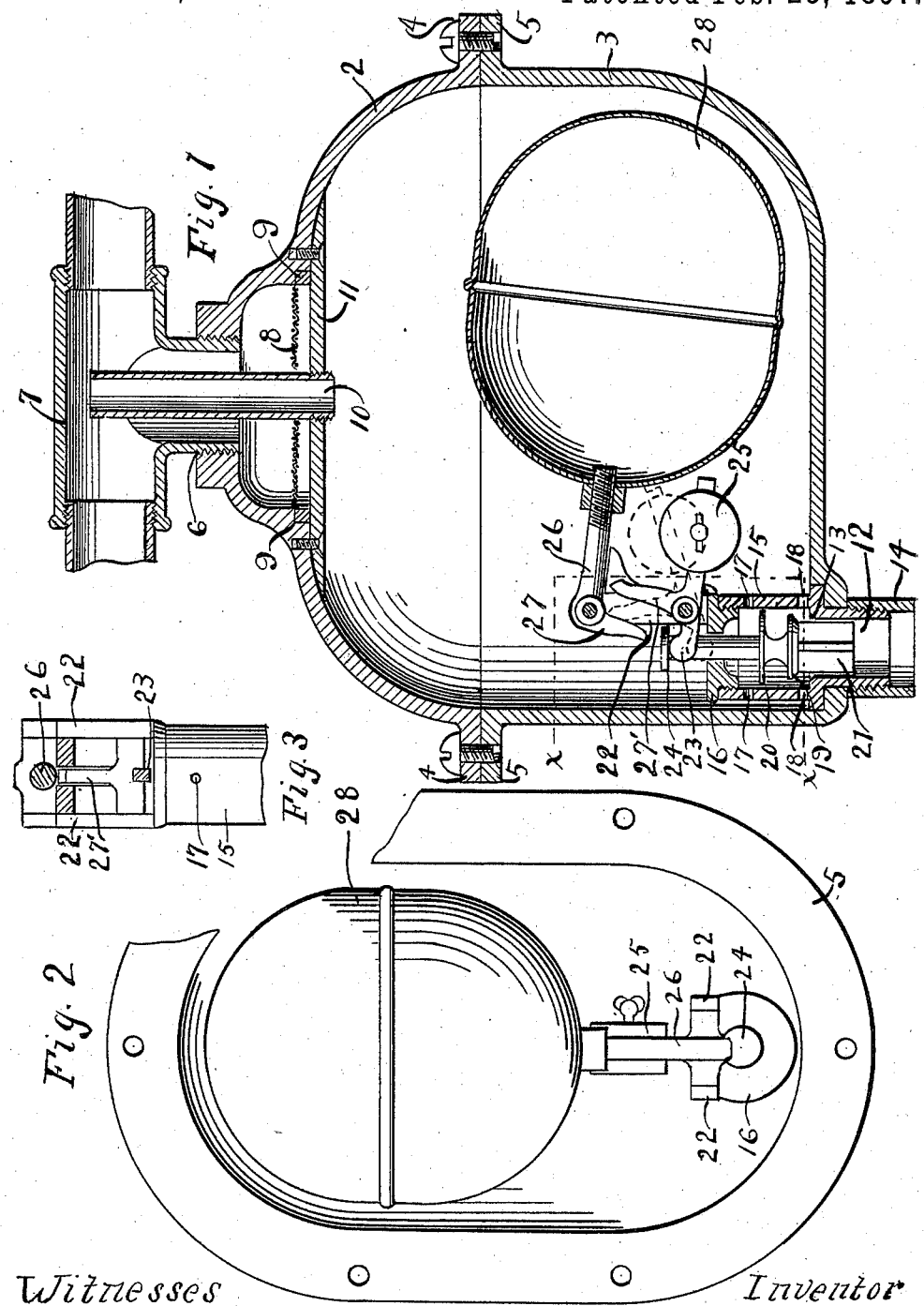
Witnesses
B. P. Shepherd
Richard Paul
Inventor
Nils Nilson
By Paul & Hawley
his Attorneys
THE NORRIS PETERS CO., PHOTO-LITHO., WASHINGTON, D. C.

UNITED STATES PATENT OFFICE.

NILS NILSON, OF MINNEAPOLIS, MINNESOTA, ASSIGNOR TO THE NILSON MANUFACTURING COMPANY, OF ST. PAUL, MINNESOTA.

STEAM-TRAP.

SPECIFICATION forming part of Letters Patent No. 577,623, dated February 23, 1897.

Application filed August 24, 1895. Serial No. 560,320. (No model.)

*To all whom it may concern:*

Be it known that I, NILS NILSON, a citizen of the United States, residing at Minneapolis, in the county of Hennepin and State of Minnesota, have invented certain new and useful Improvements in Steam-Traps, of which the following is a specification.

My invention relates to steam-traps having a valve arranged to be closed when the steam is admitted to the trap and to be opened to permit the escape of the accumulated water therein, and the device is designed particularly as an improvement over the trap shown and described in the patent issued to me September 20, 1892, Serial No. 414,432.

My invention consists generally in various constructions and combinations, all as hereinafter described, and particularly pointed out in the claims.

In the accompanying drawings, forming part of this specification, Figure 1 is a vertical longitudinal section of a trap embodying my invention. Fig. 2 is a plan view of the trap with the upper part of the casing removed. Fig. 3 is a detail sectional view on the line $x\ x$ of Fig. 1.

In the drawings, 2 and 3 represent, respectively, the upper and lower portions of the casing, each having flanges 4 and 5 on their abutting edges, said flanges being provided with threaded openings to receive screws or bolts, by means of which the upper and lower portions of the casing may be secured together. The upper portion of the casing is provided with a threaded inlet-opening 6 to receive the threaded end of the T 7, through which the steam passes to the trap, and beneath said opening is arranged a screen 8, held in position by the ring 9 and provided with a central opening, through which passes the pipe 10, having a threaded lower end to enter a threaded opening in the bar 11, which has its ends secured to the inside surface of the upper portion and extends across the inlet-opening. The pipe 10 extends up into the T for the purpose hereinafter described.

In the bottom of the lower portion of the casing is arranged the outlet-opening 12, the edges of the same being slightly recessed on the upper side to receive the valve-seat 13, which extends down through the outlet-opening and has a threaded lower end to receive the threaded end of the pipe 14.

Above the valve-seat 13, and preferably formed integrally therewith, is arranged the cylindrical portion 15, open at the top and threaded to receive the cap 16, which has a central opening in which the stem of the valve is vertically movable. The part 15 is provided in its side walls with openings or ports 17 near its upper end and with slots 18 at its lower end on a level with the bottom of the trap, and through which the water passes to the outlet-opening.

Within the cylindrical portion is arranged the valve 19, having a disk with a beveled edge to rest upon the beveled edge of the valve-seat 13, and with a larger disk 20, which is substantially the same diameter as the interior of the cylindrical portion. The valve is also provided with the guide or spider 21, which extends down through the outlet-opening and aids in seating the valve.

The cap 16 is provided with the upwardly-extending arms or brackets 22, between which and supported in bearings therein is a lever 23, having one end in engagement with the under surface of a disk 24, provided on the upper end of the stem of the valve, while its opposite end is provided with a weight 25, adjustably arranged thereon. At the upper end of the arms or brackets 22 is journaled the lever 26, provided with the depending portion 27 in position to engage an upwardly-extending arm 27', provided on the lever 23. The opposite end of the lever 26 is threaded to enter a threaded opening provided in the float 28, which is adapted to be raised by the accumulated water in the trap.

The operation of the trap is as follows: Steam is admitted through the T in the upper part of the trap, and passing through the screen in the inlet-opening, which removes the particles of foreign matter which would tend to clog up the valve, enters the trap and closes the valve arranged over the outlet-opening. As the valve closes, the weighted lever is raised to the position indicated by dotted lines in Fig. 1 and held in this position until the accumulated water in the trap raises the float and brings the depending arm 27 into engagement with the upwardly-extending arm 27' on the lever 23, which movement depresses the weighted end of the lever 23 and raises the valve to its normal position and allows the accumulated water to flow out through the slots 18 and the outlet-opening into the waste-pipe beneath.

As the trap is open when not in use there will be no danger of freezing, and if the drippings from the pipes freeze around the inlet-opening, so as to close up the same, the steam may enter the trap through the pipe 10 and the heat will soon thaw out the entire inlet-opening and allow the steam to pass through the screen as before.

Having thus described my invention, I claim as new and desire to secure by Letters Patent—

1. The combination, with the trap having inlet and outlet openings, of a valve for closing said outlet-openings, a casing therefor within which the valve-stem is vertically movable, a disk provided upon said stem, a weighted lever for normally holding said valve open, a float-lever operated by the accumulated water in the trap and said weighted lever being arranged to be moved into position by the closing of said valve to be engaged by said float-lever during its initial movement.

2. In a steam-trap, the combination, with the casing having inlet and outlet openings, of a valve arranged over said outlet, and adapted to be closed by the pressure of steam within said trap, a lever for normally holding said valve open, said lever having an upwardly-extending arm, and means actuated by the accumulated water for engaging said arm at a point where the greatest possible leverage may be obtained to start the valve, for the purpose set forth.

3. In a steam-trap the combination, with the casing having inlet and outlet openings, of the valve arranged within said casing, and adapted to close said outlet-opening, the lever for normally holding said valve open until steam is admitted to the trap, means adapted to be actuated by the accumulated water for depressing said lever and opening said valve, and a pipe arranged within said inlet-opening and extending up through the same, for the purpose set forth.

4. In a steam-trap, the combination with the casing having the inlet and outlet openings, of the valve arranged therein for closing said outlet-opening, the pivoted lever having one end in engagement with the stem of said valve, and a weight upon its opposite end, said lever being also provided with an upwardly-extending arm, a second pivoted lever provided at one end with a depending portion in position to engage said upwardly-extending arm, whereby the greatest leverage will be obtained upon said valve at the beginning of its stroke, and a float arranged upon the opposite end of said second lever, substantially as described.

5. The combination in a steam-trap, with the casing having the inlet and outlet openings, of the valve arranged therein, and arranged to close said outlet-opening, the cylindrical portion arranged above said outlet opening, and provided with a series of ports or openings, the cap for the same having a central opening to receive the stem of said valve, the brackets upon said cap, the weighted lever journaled at the base of said brackets, and having one end in engagement with said stem, and provided with an upwardly-extending arm, a second lever pivoted upon said brackets, and having a depending portion to engage the upwardly-extending arm to obtain the greatest leverage upon said valve at the beginning of its stroke, and the float provided at the opposite end of said second lever, substantially as described and for the purpose set forth.

6. In a steam-trap the combination, with the casing having the inlet and outlet openings, of the valve arranged to close said outlet-opening, means adapted to be operated by the accumulated water for opening said valve, a screen arranged in said inlet-opening, and a tube extending through said screen and inlet-opening, for the purpose set forth.

In testimony whereof I have hereunto set my hand this 21st day of August, A. D. 1895.

NILS NILSON.

In presence of—
A. C. PAUL,
RICHARD PAUL.